US008949506B2

(12) United States Patent
Post et al.

(10) Patent No.: US 8,949,506 B2
(45) Date of Patent: Feb. 3, 2015

(54) INITIATING WEAR LEVELING FOR A NON-VOLATILE MEMORY

(75) Inventors: Daniel J. Post, Campbell, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 680 days.

(21) Appl. No.: 12/847,766

(22) Filed: Jul. 30, 2010

(65) Prior Publication Data
US 2012/0030409 A1    Feb. 2, 2012

(51) Int. Cl.
G06F 12/10    (2006.01)
G06F 12/02    (2006.01)

(52) U.S. Cl.
CPC .... G06F 12/0246 (2013.01); *G06F 2212/7205* (2013.01); *G06F 2212/7211* (2013.01); *Y02B 60/1225* (2013.01)
USPC ............ 711/103; 711/154; 711/165; 711/203

(58) Field of Classification Search
CPC .......................... G06F 12/0223; G06F 12/0246
USPC .................................. 711/103, 154, 165, 203
See application file for complete search history.

(56) References Cited

U.S. PATENT DOCUMENTS

| 5,341,339 | A | * | 8/1994 | Wells ....................... 365/185.11 |
|---|---|---|---|---|
| 5,388,083 | A | | 2/1995 | Assar et al. |
| 8,028,121 | B2 | | 9/2011 | Jeong |
| 8,090,899 | B1 | | 1/2012 | Syu |
| 8,103,821 | B2 | | 1/2012 | Chang et al. |
| 8,266,481 | B2 | | 9/2012 | Moshayedi |
| 8,275,928 | B2 | | 9/2012 | Lin |
| 2003/0191916 | A1 | * | 10/2003 | McBrearty et al. ........... 711/162 |
| 2005/0108296 | A1 | * | 5/2005 | Nakamura et al. ........... 707/200 |
| 2005/0114589 | A1 | | 5/2005 | Lofgren et al. |
| 2005/0132126 | A1 | | 6/2005 | Lin et al. |
| 2007/0115974 | A1 | * | 5/2007 | Messenger .................... 370/389 |
| 2007/0294490 | A1 | | 12/2007 | Freitas et al. |
| 2008/0282025 | A1 | | 11/2008 | Biswas et al. |
| 2009/0240873 | A1 | | 9/2009 | Yu et al. |
| 2009/0265508 | A1 | | 10/2009 | Bennett et al. |
| 2010/0023675 | A1 | * | 1/2010 | Chen et al. ..................... 711/103 |
| 2010/0037006 | A1 | | 2/2010 | Chen et al. |
| 2010/0169542 | A1 | | 7/2010 | Sinclair |
| 2010/0174845 | A1 | | 7/2010 | Gorobets et al. |
| 2010/0211737 | A1 | | 8/2010 | Flynn et al. |
| 2010/0268871 | A1 | | 10/2010 | Lee et al. |
| 2011/0022819 | A1 | | 1/2011 | Post et al. |
| 2011/0029715 | A1 | | 2/2011 | Hu et al. |

FOREIGN PATENT DOCUMENTS

EP    1804169    7/2007

* cited by examiner

*Primary Examiner* — Jae Yu
(74) *Attorney, Agent, or Firm* — Van Court & Aldridge LLP

(57) ABSTRACT

Systems and methods are provided for initiating wear leveling on block-aligned boundaries for non-volatile memories ("NVMs"), such as flash memory. In some embodiments, an electronic device including the NVM may suspend the programming of data upon reaching the end of a dynamic block. The electronic device may then perform wear leveling on a low-cycled block of the NVM. The electronic device may thus be configured to copy static data from the low-cycled block to another block of the NVM. After wear leveling has completed, the memory interface can program a second portion of the data to a new dynamic block of the NVM. This way, the electronic device can improve the efficiency of garbage collection. In addition, the electronic device can decrease the programming time for user generated writes, the wearing of the NVM, and overall power consumption.

9 Claims, 5 Drawing Sheets

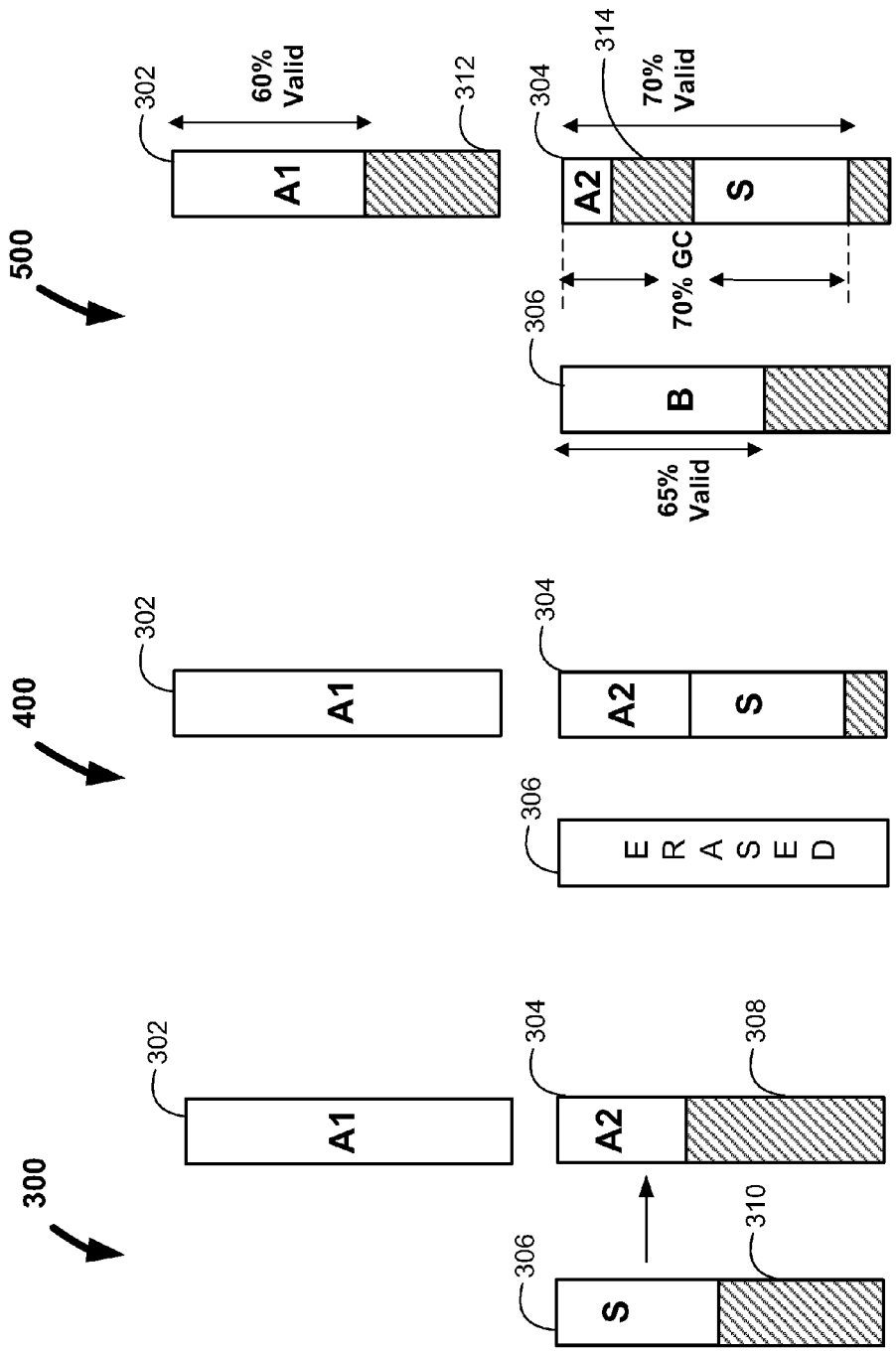

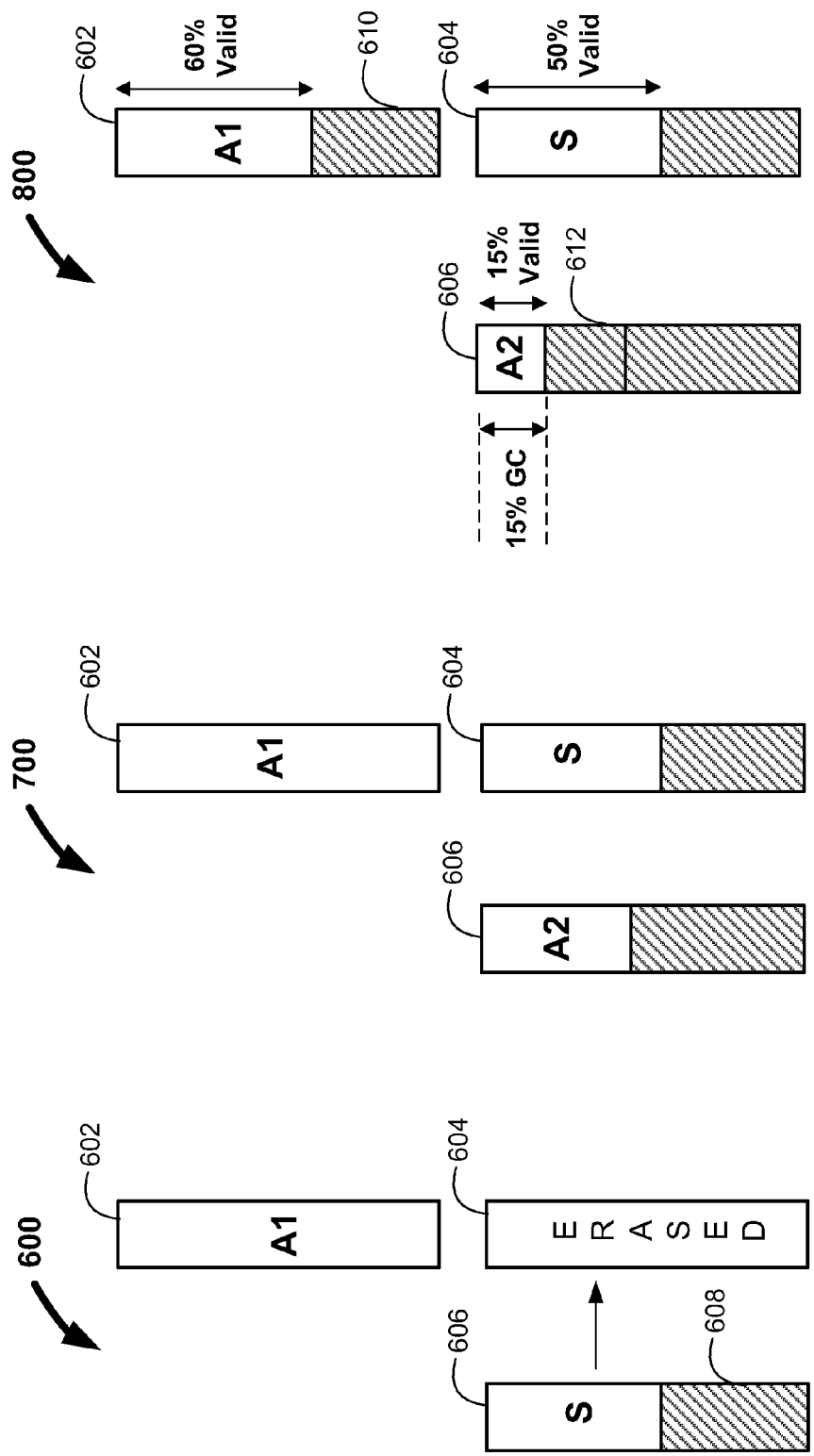

INITIATING WEAR LEVELING FOR A NON-VOLATILE MEMORY

FIELD OF THE INVENTION

This can relate to systems and methods for initiating wear leveling for non-volatile memories, such as flash memories.

BACKGROUND OF THE DISCLOSURE

NAND flash memory, as well as other types of non-volatile memories ("NVMs"), are commonly used in electronic devices for mass storage. For example, consumer electronics such as portable media players often include flash memory to store music, videos, and other media.

A block of a non-volatile memory may include both data that is needed by an electronic device (e.g., "valid data") and data that is no longer needed by the electronic device (e.g., "invalid data"). In addition, valid data can be separated into data that is frequently updated or changed (e.g., "dynamic data") and data that is rarely updated or changed (e.g., "static data").

Some non-volatile memories are configured such that a block of programmed memory locations needs to be erased before any of the memory locations in the block can be reprogrammed. Therefore, electronic devices typically perform an operation referred to as "garbage collection" ("GC") to free up blocks for erasing and reprogramming. To free up all of the memory locations in that block for erasing, the electronic device may copy the block's valid data into memory locations of another block. In some cases, garbage collection may be performed on a block that has the least amount of valid data, which may sometimes be referred to as a "least valid block". In addition, electronic devices may also perform garbage collection on a block that has the least wear using an operation referred to as "wear leveling".

When wear leveling is initiated on a first block of a non-volatile memory, the electronic device must copy all valid data of the first block to a second block, regardless of whether the data is dynamic or static. Unfortunately, although the dynamic data will eventually be deleted from the second block and updated at other locations in the non-volatile memory, the second block may still have valid static data even after a substantial period of time. Hence, this process may prevent the second block from becoming the least valid block, and consequently prevent garbage collection from being performed on the second block. Because the garbage collection process cannot be initiated on the second block, the free space of the second block may remain locked up and unavailable for reprogramming.

SUMMARY OF THE DISCLOSURE

Accordingly, systems and methods are disclosed for initiating wear leveling on block-aligned boundaries. In this way, data that is rarely updated or changed (e.g., "static data") and data that is frequently updated or changed (e.g., "dynamic data") can be separated on different blocks and the overall performance of the system can be substantially improved. As a result, some blocks in the system can include static data that is generally valid, and other blocks in the system can include dynamic data that is generally less valid than static data.

The system may be an electronic device that may include a system-on-a-chip and a non-volatile memory (NVM). The NVM may include flash memory, such as NAND flash memory, or any other suitable type of non-volatile memory that may be blockwise eraseable. The NVM may include one or more NVM dies and associated circuitry to enable accessing and operation of those dies. In some embodiments, the NVM may also include its own controller and other components such as an error correction code module.

By separating static and dynamic data, the efficiency of garbage collection can be improved and the need for extensive garbage collection can be avoided. The separation of static and dynamic data can also decrease the programming time for user generated writes, the wearing of the NVM, and the overall power consumption of the electronic device. In addition, by aligning data along one or more block boundaries, the NVM interface can maintain block alignment without supporting multiple open blocks.

In some embodiments, the system-on-a-chip of the electronic device can include a NVM interface, sometimes referred to herein as a "memory interface," for accessing the NVM. The memory interface may include a translation layer, such as flash translation layer ("FTL"). The translation layer may be configured to handle write requests to write new user data (e.g., dynamic data) to the NVM. The write requests may be received from a file system or host, for example.

In some embodiments, in response to receiving the write request, the memory interface may be configured to program a first portion of the user data to a first block of the NVM. Upon reaching the end of the first block, the memory interface can determine whether wear leveling is needed. For example, the memory interface can determine if a wear leveling queue is empty. As another example, the memory interface can determine whether a condition variable is in a particular state (e.g., determine whether wear leveling is engaged). As yet another example, the memory interface can determine whether a periodicity counter has reached a pre-determined threshold (e.g., whether the number of blocks or super blocks that have been programmed since the last wear leveling operation has reached a pre-determined threshold).

If the memory interface determines that wear leveling is needed (e.g., the wear leveling queue is not empty, the condition variable is in the particular state, and/or the periodicity counter has reached the pre-determined threshold), the memory interface can determine whether to suspend the programming of the user data in order to perform wear leveling. This determination can be made based on one or more factors such as, for example, whether a suppression command has been received from the file system, the input/output ("I/O") priority of the user data, whether the bandwidth of the write operation allows for suspension of the programming (e.g., the size of the data and/or a ratio of the number of programmed blocks to the number of wear leveling operations), any other suitable factor, and/or any combination thereof.

If one or more of these factors are satisfied, the memory interface can suspend the programming of the data on a block-aligned boundary. Then, the memory interface, via the translation layer, can be configured to initiate wear leveling on a block of the NVM (e.g., a low-cycled block). In some embodiments, the low-cycled block can selected from a wear leveling queue. For example, the low-cycled block can be a static block of the NVM. In some embodiments, the low-cycled block can be a block of the NVM that has the most static data (e.g., as determined using heuristics or indications from applications in the system).

Wear leveling can involve the memory interface copying data (e.g., static data) from the low-cycled block to another block of the NVM. In some embodiments, the block where the data is being copied can be the highest-cycled block of the NVM. In other embodiments, the block where the data is being copied can be selected based on a programming order.

After all of the data has been copied from the low-cycled block, the memory interface can erase the data on the low-cycled block.

The memory interface can then continue to program the user data to a new dynamic block of the NVM. In some embodiments, the memory interface can select the low-cycled block as the new dynamic block. In other embodiments, the memory interface can select the lowest-cycled block of the NVM as the new dynamic block, which may or may not be the same as the low-cycled block. In response to selecting the new dynamic block, the memory interface can program a second portion of the user data to the new dynamic block.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 3-5 are a set of illustrative graphical views of dynamic and static data stored in a non-volatile memory in accordance with various embodiments of the invention;

FIGS. 6-8 are another set of illustrative graphical views of dynamic and static data stored in a non-volatile memory in accordance with various embodiments of the invention;

DETAILED DESCRIPTION OF THE DISCLOSURE

Figure 1:
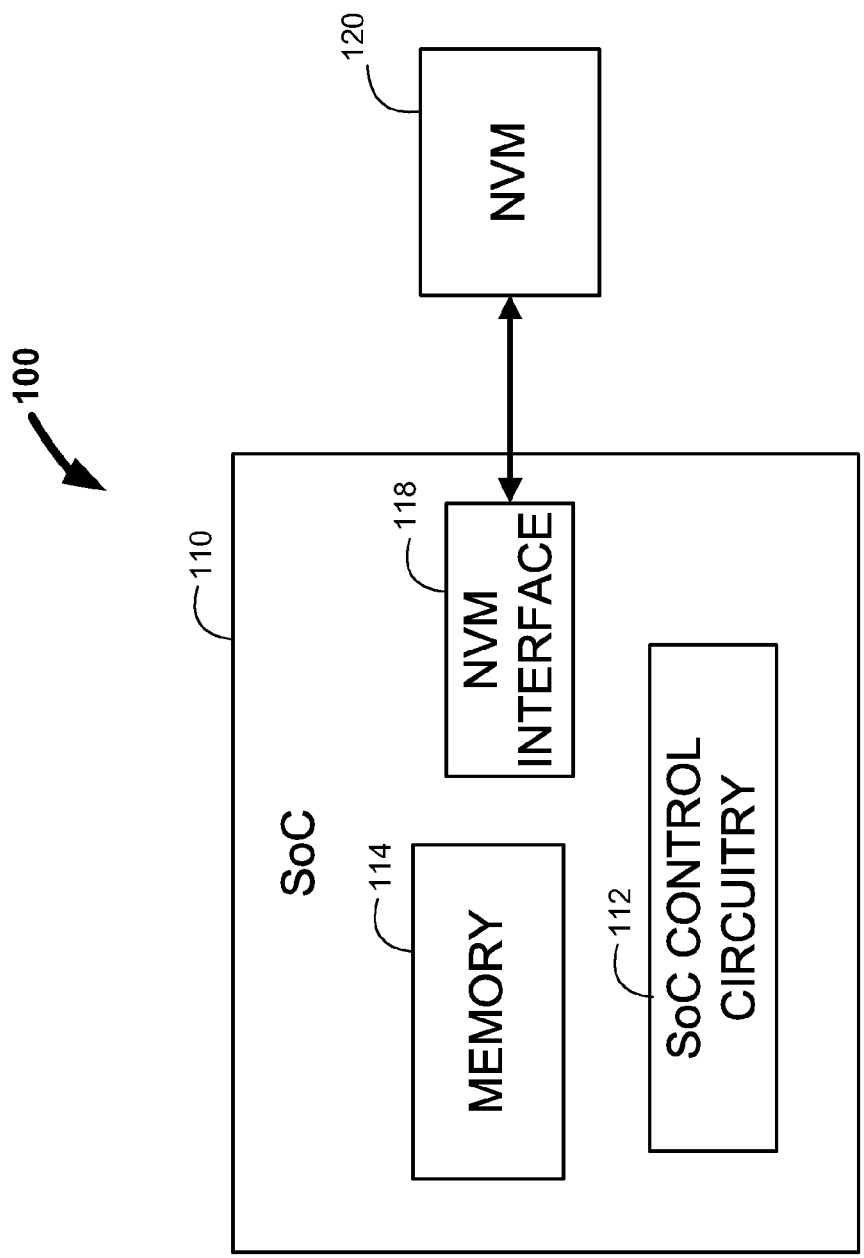
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof.

NVM 120 can be organized into "blocks" that may each be erasable at once, and further organized into "pages" that may each be programmable and readable at once. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

For example, user data may include both "dynamic data" and "static data". Dynamic data can include any data that is frequently generated or obtained by SoC control circuitry 112 (e.g., data associated with an application). In contrast, static data can include any data that is rarely generated or obtained by SoC control circuitry 112 (e.g., an image of the operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store the user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry".

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
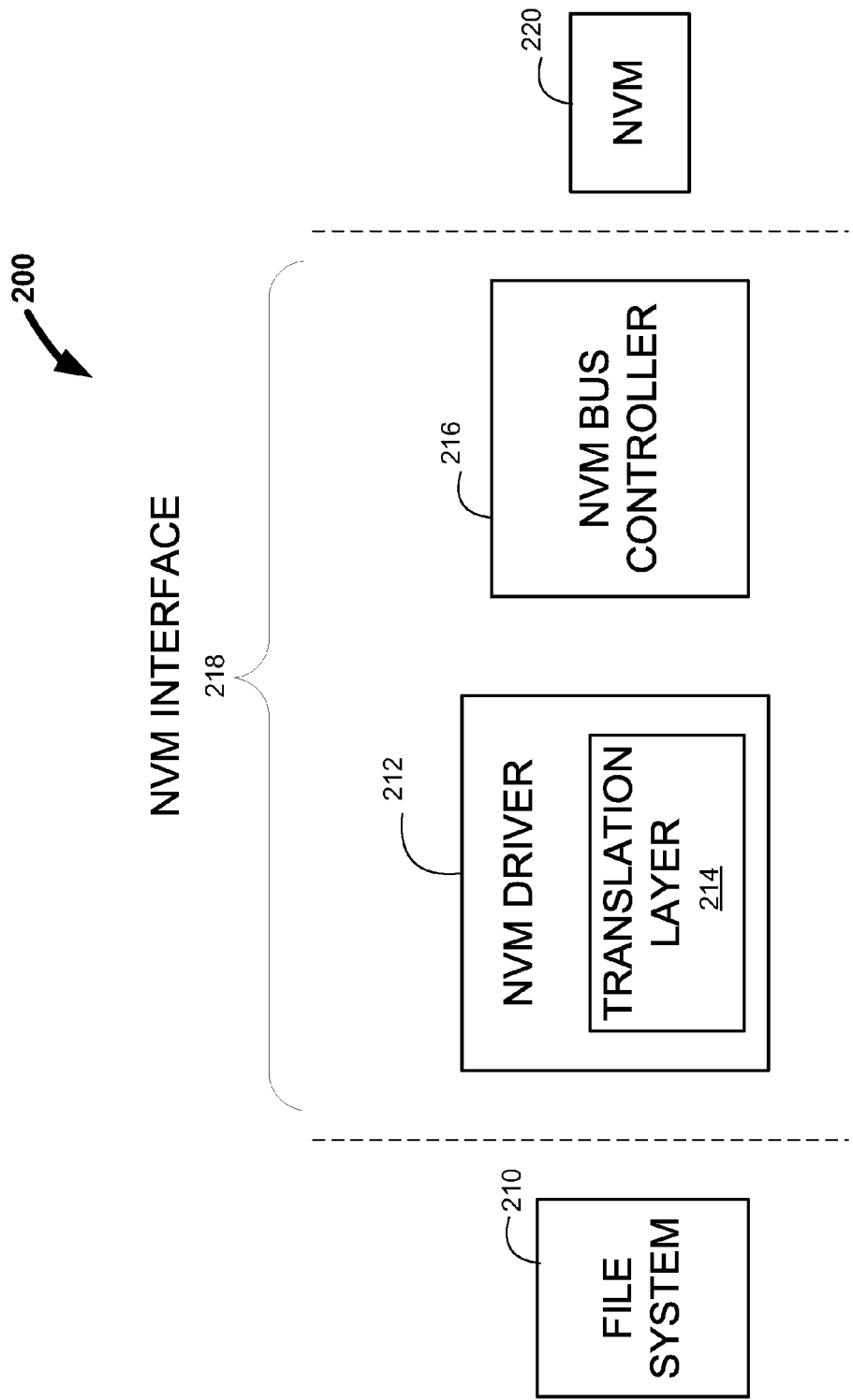

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system and may be part of the operating system of electronic device 200 (e.g., part of SoC control circuitry 112 of FIG. 1). In some embodiments, file system 210 may include a flash file system, which provides a logical to physical mapping of pages. File system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

In some embodiments, NVM driver 212 can include translation layer 214. Translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

In some embodiments, NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. For example, the metadata may contain a flag that indicates whether the stored data is good data (e.g., whether the stored data is still valid data).

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. For example, in embodiments where NVM interface 218 maps logical sectors directly to physical pages, NVM interface 218 may store logical-to-physical mappings in pages in the NVM.

In some embodiments, the conversion of logical addresses to physical addresses may be necessary because NVM 220 may not be write-in-place. That is, even if file system 210 issues two write requests to the same logical address, NVM interface 218 may not be able to program the user data to the same physical address (nor would it be advantageous to do so in many scenarios). This is because NVM interface 218 may need to program user data into memory locations that are in an erased state (as opposed to a programmed state). Therefore, at any point during the operation of electronic device 200, multiple memory locations in NVM 220 may be programmed with user data associated with the same logical address. One of these memory locations may include user data from the most recent write request, and may therefore be the valid version of the user data for that logical address, referred to sometimes as "valid data". The other memory locations may include user data corresponding to older write requests, and therefore these memory locations store "invalid data" that may no longer be needed by electronic device 200.

In some embodiments, in addition to logical-to-physical address mapping, translation layer 214 can perform any of the other functions that may be typical of flash translation layers.

For example, translation layer 214 can perform garbage collection ("GC") to free up a programmed block of NVM 220 for erasing. Once freed and erased, the memory locations can be used to store new user data received from file system 210, for example. NVM 220 may be blockwise eraseable, so that all of the memory locations in a programmed block are erased in the same erase operation. Because a programmed block containing invalid data may also contain valid data, the garbage collection process may involve copying the valid data from the programmed block to another block having erased memory locations, thereby invalidating the valid data in the programmed block. Once all of the memory locations in the programmed block have been invalidated, translation layer 214 may direct bus controller 216 to perform an erase operation on the programmed block. For clarity, the step of copying data from a programmed block in order to invalidate the data may be referred to sometimes as "freeing up" the programmed block.

As another example, translation layer 214 can perform wear leveling to provide for similar wear on all blocks of NVM 220. For instance, translation layer 214 can monitor the number of cycles (e.g., erase cycles and/or write cycles) that each block of NVM 220 has cycled through. Then, at a suitable time (e.g., during idle time or during a garbage collection process), translation layer 214 can select the lowest-cycled block of NVM 220 to initiate wear leveling. The lowest-cycled block will generally include static data that has been not been moved for a long period of time. In some embodiments, the lowest-cycled block can be selected using a wear leveling queue, which can include one or more candidate blocks of NVM 220 that need to be wear leveled.

In response to selecting the lowest-cycled block, translation layer 214 can initiate wear leveling on that block. For example, translation layer 214 may free up and erase the lowest-cycled block. In some embodiments, translation layer 214 can copy the valid data stored on the lowest-cycled block to a block that is fairly dynamic (e.g., the highest-cycled block of NVM 220). In some embodiments, the highest-cycled block can be a block that had previously been used to store dynamic data and has consequently received more wear.

After the lowest-cycled block has been erased, NVM interface 218 can program the lowest-cycled block with new user data received from file system 210. Thus, by performing wear leveling periodically on one or more blocks of NVM 220, translation layer 214 can ensure that all blocks of NVM 220 will ultimately have undergone a similar number of cycles and will therefore receive similar wear.

Referring now to FIGS. 3-5, graphical views 300, 400, and 500 of illustrative blocks 302, 304, and 306 are shown at a first time $t_1$, a second time $t_2$, and a third time $t_3$, respectively. Blocks 302, 304, and 306 may be any three suitable blocks of NVM 120 (FIG. 1) or NVM 220 (FIG. 2). Persons skilled in the art will appreciate that FIGS. 3-5 may include any suitable number of blocks. For the sake of simplicity, however, only three blocks are shown in FIGS. 3-5.

At a time $t_1$ (FIG. 3), blocks 302, 304, and 306 may be in a programmed state. As programmed blocks, blocks 302, 304, and 306 may include a number of memory locations (e.g., pages) that store data. The stored data may be valid or invalid. For example, the shaded portions of each programmed block (e.g., shaded portions 308 and 310 of blocks 304 and 306, respectively) can represent the invalid data and the un-shaded portions of each programmed block can represent the valid data.

It should be understood that the shading within the blocks is intended only to illustrate the proportion of memory locations in each block that store valid data, but not which memory locations store valid data or invalid data. Thus, it should be understood that the valid data and invalid data in each block may actually be interspersed within the memory locations of the block.

The valid data programmed in each block can include dynamic data and/or static data. For example, blocks 302 and 304 may store portions of dynamic data A. For simplicity, the dynamic data stored in block 302 may be referred to as a first portion of dynamic data A1, and the dynamic data stored in block 304 may be referred to as a second portion of dynamic data A2. In addition, the static data stored in block 306 may be referred to as static data S.

To reach the state shown in FIG. 3, a NVM interface (e.g., NVM interface 118 of FIG. 1 or NVM interface 218 of FIG. 2) may have a programming order such that a first portion of data A1 is programmed first into block 302, and then a second portion of data A2 is programmed into block 304. For example, in response to receiving a write request from a file system (e.g., file system 210 of FIG. 2) to program dynamic data A of a particular size (e.g., 64 pages of dynamic data), the NVM interface may program a first portion of dynamic data A1 (e.g., 42 pages) into block 302. Then, upon reaching the end of block 302, the NVM interface may continue to program a second portion of dynamic data A2 (e.g., the remaining 22 pages) into block 304.

Some time after programming dynamic data A, the NVM interface may initiate wear leveling either during an idle time or during a garbage collection process. For example, the NVM interface can select to initiate wear leveling on block 306, which can be the lowest-cycled block of the NVM. FIG. 3 may therefore illustrate a time $t_1$ when the NVM interface has finished programming dynamic data A into blocks 302 and 304 and is ready to initiate wear leveling on block 306.

Referring now to FIG. 4, graphical view 400 of blocks 302, 304, and 306 is shown at a time $t_2$ after wear leveling has been performed on block 306. At time $t_2$, blocks 302 and 304 may be in a programmed state, and block 306 may be in an erased state.

To reach this state, the NVM interface may have copied static data S from block 306 to block 304. After all of static data S has been copied to block 304, the NVM interface can erase static data S on block 306.

FIG. 5 is a graphical view 500 of blocks 302, 304, and 306 at a time $t_3$. At time $t_3$, the NVM interface may have recently finished programming dynamic data B on block 306. In addition, between time $t_2$ and time $t_3$, more recent write requests for the logical address associated with dynamic data A may have replaced portions of previously programmed dynamic data A1 and A2. Therefore, shaded portions 312 and 314 can correspond to respective portions of blocks 302 and 304 that now include invalid dynamic data.

In contrast to dynamic data, however, static data can stay unchanged and therefore remain valid over a substantial period of time. Thus, all of static data S stored in block 304 may still be valid at time $t_3$.

Then, at a suitable time after time $t_3$ (e.g., an idle time or when the NVM has run out of programming space), the NVM interface may initiate garbage collection if the NVM interface determines that the number of memory locations in the NVM has fallen below a pre-determined threshold (e.g., when the number of erased blocks falls below a pre-determined threshold). In order to initiate garbage collection, the NVM interface may select a block with the smallest amount or proportion of valid data (e.g., a block with a smallest valid count) as the block to completely free up. In some cases, such a block may be referred to as a "least valid block". Thus, in the example shown in FIG. 5, the NVM interface may select block 302, which includes 60% valid data, as the block to free up. This is because block 302 has the smallest amount of valid data as compared to block 304 with 70% valid data (e.g., the combination of valid dynamic data A2 and valid static data S) and block 306 with 65% valid data.

The mixture of dynamic data A2 and static data S in block 304 may prevent block 304 from becoming the least valid block in the NVM. That is, because static data S will generally remain valid, the valid count of block 304 may stop decreasing after a certain period of time, and, as a result, the NVM interface may rarely initiate a garbage collection process on block 304. Due to the lack of a garbage collection process, the free and invalid space of block 304 (e.g., the shaded portions of block 304) may consequently remain locked up and unavailable for reprogramming.

Moreover, the number of valid pages in a block that is being freed up can be an indication of the efficiency of garbage collection. In particular, a higher efficiency can be achieved if the amount of valid data that has to be moved (e.g., the number of writes to the NVM) during garbage collection is minimal. Therefore, even if the NVM interface initiated a garbage collection process on a block with a mixture of static and dynamic data, such as block 304, the efficiency of garbage collection is relatively low because the NVM interface has to move almost all of the static data stored on the block since static data remains relatively valid over time. For instance, for block 304, 70% of the data stored in block 304 must be moved in order to free up block 304.

Thus, by programming data to blocks without regard to block-aligned boundaries, many of the blocks in the NVM can be classified as having average validity (e.g., almost all of the blocks may have pages that include a significant proportion of valid data). In particular, under such a scenario, an average of 70% of the pages of each block of the NVM will be filled with valid data. Hence, the mixing of dynamic data and static data on blocks decreases the efficiency of garbage collection. Moreover, this mixing also increases the programming time for user generated writes, the wearing of the NVM, and the power consumption of the electronic device.

Referring now to FIGS. 6-8, graphical views 600, 700, and 800 of illustrative blocks are shown at a first time $t_1$, a second time $t_2$, and a third time $t_3$, respectively. Blocks 602, 604, and 606 may be any three suitable blocks of NVM 120 (FIG. 1) or NVM 220 (FIG. 2). Persons skilled in the art will appreciate that FIGS. 6-8 may include any suitable number of blocks. For the sake of simplicity, however, only three blocks are shown in FIGS. 6-8.

At a time $t_1$ (FIG. 6), blocks 602 and 606 may be in a programmed state, and block 604 may be in an erased state. Similar to programmed blocks 302, 304, and 306 of FIG. 3, blocks 602 and 606 may include a number of memory locations (e.g., pages) that store valid or invalid data. For example, the shaded portion(s) of each programmed block (e.g., shaded portion 608 of block 606) can represent the invalid data and the un-shaded portions of each programmed block can represent the valid data.

It should be understood that the shading within each block is intended only to illustrate the proportion of memory locations in each block that store valid data, but not which memory locations store valid data or invalid data. Thus, it should be understood that the valid data and invalid data in each block may actually be interspersed within the memory locations of the block.

The valid data programmed in each block can include dynamic data and/or static data. For example, block 602 may store a portion of dynamic data A. For simplicity, the dynamic data stored in block 602 may be referred to as a first portion of dynamic data A1. In addition, the static data stored in block 606 may be referred to as static data S.

To reach the state shown in FIG. 6, in response to receiving a write request from a file system (e.g., file system 210 of FIG. 2) to program dynamic data A of a particular size (e.g., 64 pages of data) to the NVM, a NVM interface (e.g., NVM interface 118 of FIG. 1 or NVM interface 218 of FIG. 2) may program a first portion of dynamic data A1 (e.g., 42 pages) into block 602.

Then, upon detecting an end of block 602, the NVM interface can determine whether wear leveling is needed for the NVM. In some embodiments, the NVM interface can determine that wear leveling is needed by determining that a wear leveling queue is not empty. In other embodiments, the memory interface can determine that wear leveling is needed by determining that a condition variable is in a particular state (e.g., determine that wear leveling is engaged). In further embodiments, the memory interface can determine that wear leveling is needed by determining that a periodicity counter has reached a pre-determined threshold (e.g., determine that the number of blocks or super blocks that have been programmed since the last wear leveling operation has reached a pre-determined threshold).

In response to determining that wear leveling is needed, the NVM interface can suspend the programming of dynamic data A. Then, in some embodiments, the NVM interface can select a low-cycled block from the wear-leveling queue. In other embodiments, the NVM interface can select the low-cycled block by determining which block of the NVM has the most static data using heuristics or indications from applications in the system. In the example shown in FIG. 6, for instance, block 606 may be the low-cycled block selected by the NVM interface.

In addition, the NVM interface may select to copy static data S from block 606 to block 604. In some embodiments, block 604 may be a block that is fairly dynamic (e.g., the highest-cycled block of the NVM). By copying static data S to block 604, the NVM interface can change block 604 from a dynamic block used for storing dynamic data to a static block used for storing static data. This adjustment can therefore help slow down or prevent additional wear on already high-cycled blocks of the NVM, such as block 604. Consequently, this adjustment can prevent these high-cycled blocks from prematurely reaching a maximum cycle specification, which may cause the system to run out of bad block reserves. As used herein, the "bad block reserves" may refer to one or more blocks of the NVM used to replace blocks that can no longer be used to store data.

As discussed above, FIG. 6 may illustrate a time $t_1$ when the NVM interface has just finished programming a first portion of dynamic data A1 into block 602 and is ready to initiate wear leveling on block 606.

Referring now to FIG. 7, graphical view 700 is shown of blocks 602, 604, and 606 at a time $t_2$ after wear leveling has been performed on block 606 and a second portion of dynamic data A2 has been programmed into block 606.

To reach this state, the NVM interface may have copied static data S from block 606 to block 604. After all of the static data S has been copied to block 604, the NVM interface can erase static data S on block 606.

Then, after block 606 has been erased, the NVM interface may program a second portion of dynamic data A2 (e.g., the remaining 22 pages of the dynamic data) into block 606. Therefore, if block 606 is the lowest-cycled block, the NVM interface can change block 606 from a static block used for storing static data to a dynamic block used for storing dynamic data. This adjustment can help to increase the wear of block 606. Although the NVM interface has chosen to program the second portion of dynamic data A2 to the wear-leveled block (e.g., block 606), persons skilled in the art will appreciate that the NVM interface can instead select another block of the NVM to program the second portion of dynamic data A2.

FIG. 8 is a graphical view 800 of blocks 602, 604, and 606 at a time $t_3$. In some cases, between time $t_2$ and time $t_3$, more recent write requests for the logical address associated with dynamic data A may have replaced portions of previously programmed dynamic data A1 and A2. Therefore, shaded portions 610 and 612 can correspond to respective portions of blocks 602 and 606 that now include invalid dynamic data. In contrast to dynamic data A1 and A2, all of static data S stored in block 604 may still be valid at time $t_3$.

Then, at a suitable time after time $t_3$ (e.g., an idle time or when the NVM has run out of programming space), the NVM interface may initiate garbage collection. In order to initiate garbage collection, the NVM interface may select a block with the smallest amount or proportion of valid data as the block to completely free up. In the example shown in FIG. 8, the NVM interface may select block 606, which includes 15% valid data (e.g., 15% dynamic data A2), as the block to free up. This is because block 606 has the smallest amount of valid data as compared to blocks 602 (e.g., 60% valid data) and 604 (e.g., 50% valid data).

Thus, by separating static and dynamic data in the NVM and moving wear level detection to the active write path, the NVM interface can drastically improve the efficiency of garbage collection and avoid the need for extensive garbage collection. For example, because some blocks (e.g., dynamic blocks) are configured to only store dynamic data, most of these blocks will eventually have little or no valid pages due to the frequency with which dynamic data is updated. Since garbage collection is performed on blocks with the smallest amount of valid data, the NVM interface can perform garbage collection on these dynamic blocks in a short amount of time with relatively few operations. For instance, for block 606, the efficiency of garbage collection is relatively high because the NVM interface only has to move 15% of the data stored in block 606 in order to free up block 606.

Correspondingly, this separation of static and dynamic data decreases the programming time for user generated writes, the wearing of the NVM, and the power consumption of the electronic device. In addition, by aligning data along one or more block boundaries, this process allows the NVM interface to maintain block alignment without supporting multiple open blocks. Moreover, the separation of static and dynamic data can be accomplished with minimal impact on other memory operations of the electronic device (e.g., no changes to the restore path or metadata fields).

Figure 9:
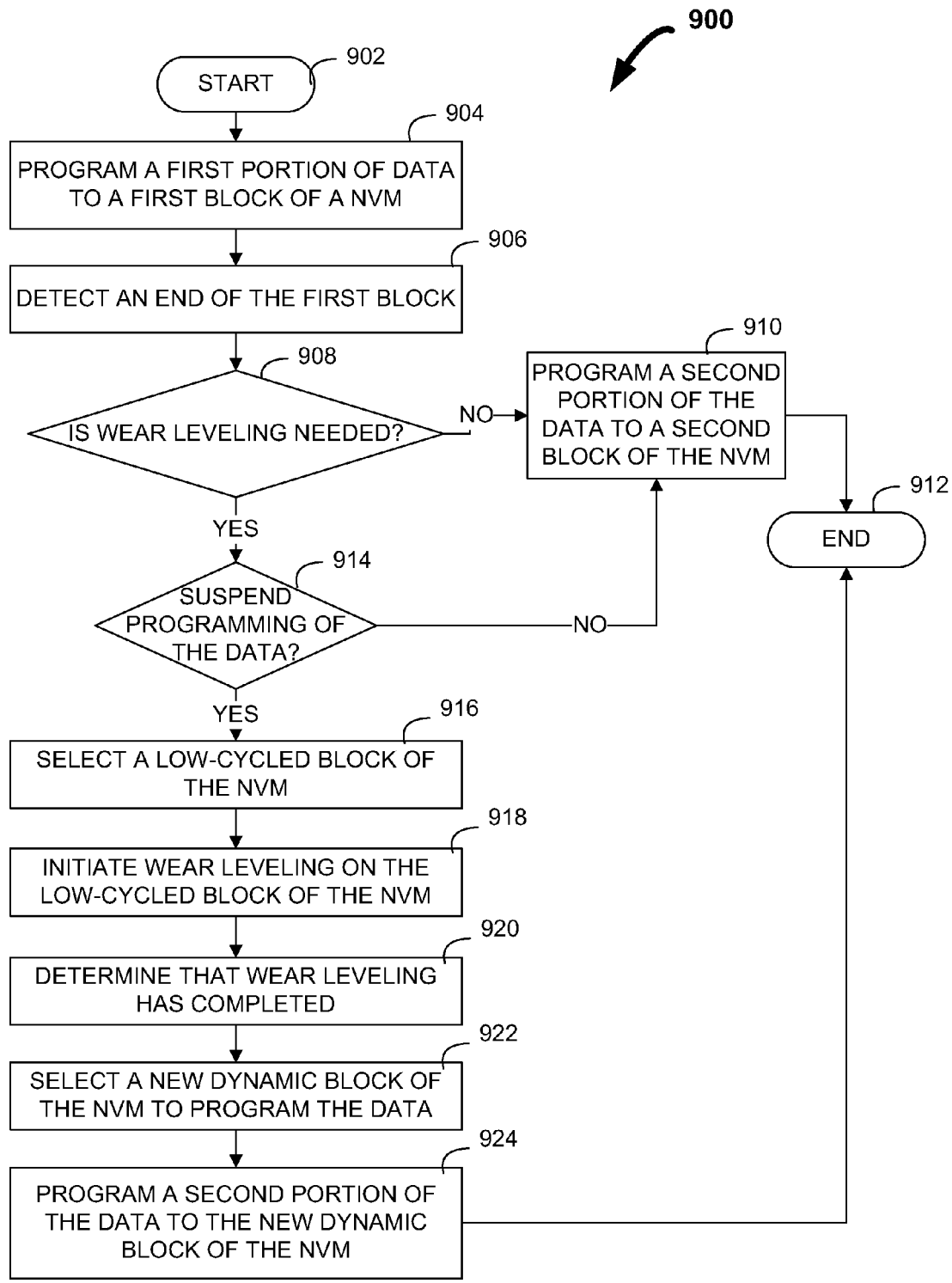
FIG. 9 is a flowchart of an illustrative process for initiating wear leveling on block-aligned boundaries in accordance with various embodiments of the invention.

Referring now to FIG. 9, a flowchart of illustrative process 900 is shown for initiating wear leveling on block-aligned boundaries. The steps of process 900 may be executed by a memory interface for any suitable electronic device or system, such as by NVM interface 118 of electronic device 100 (FIG. 1) or NVM interface 218 of electronic device 200 (FIG. 2).

Process 900 may begin at step 902, where the memory interface may have received a write request to program data (e.g., dynamic data) to a NVM (e.g., NVM 120 of FIG. 1 or NVM 220 of FIG. 2). For example, the write request may have been received from a file system (e.g., file system 210 of FIG. 2).

At step 904, in response to receiving the write request, the memory interface may program a first portion of the data to a first block of the NVM (e.g., block 302 of FIGS. 3-5 or block 602 of FIGS. 6-8). In some embodiments, the first block can be a dynamic block of the NVM used for storing dynamic data. Then, at step 906, the memory interface may detect an end of the first block. Persons skilled in the art will appreciate that the memory interface may program data to any suitable number of blocks of the NVM (e.g., one or more blocks) before detecting an end of a last programmed block at step 906.

Continuing to step 908, upon reaching the end of the first block, the memory interface can determine whether wear leveling is needed. For example, the memory interface can determine if a wear leveling queue is empty. As another example, the memory interface can determine whether a condition variable is in a particular state (e.g., determine whether wear leveling is engaged). As yet another example, the memory interface can determine whether a periodicity counter has reached a pre-determined threshold (e.g., whether the number of blocks or super blocks that have been programmed since the last wear leveling operation has reached a pre-determined threshold).

If, at step 908, the memory interface determines that wear leveling is not needed (e.g., the wear leveling queue is empty, the condition variable is not in the particular state, and/or the periodicity counter has not reached the pre-determined threshold), process 900 may move to step 910. At step 910, the memory interface can program a second portion of the data to a second block of the NVM (e.g., block 304 of FIGS. 3-5). In some embodiments, the memory interface can program the data in a manner similar to the example provided in FIG. 3. After programming the second portion of the data to the second block of the NVM, process 900 may end at step 912.

If, at step 908, the memory interface instead determines that wear leveling is needed (e.g., the wear leveling queue is not empty, the condition variable is in the particular state, and/or the periodicity counter has reached the pre-determined threshold), process 900 may move to step 914. At step 914, the memory interface can determine whether to suspend the programming of the data in order to perform wear leveling. This determination can be made based on one or more factors such as, for example, whether a suppression command has been received from the file system, the input/output ("I/O") priority of the data, whether the bandwidth of the write operation allows for suspension of the programming (e.g., the size of the data and/or a ratio of the number of programmed blocks to the number of wear leveling operations), any other suitable factor, and/or any combination thereof.

In some embodiments, for example, the memory interface may have determined not to suspend the programming based on determining that system performance is important at this time (e.g., the write request is time-critical). For example, the memory interface may have received a suppression command from the file system. As another example, the memory interface may have determined that the I/O priority of the write request is high based on metadata associated with the write request.

In other embodiments, the memory interface may have determined that the bandwidth of the write operation does not permit a suspension of the programming of the data. For example, the memory interface may have determined that the size of the data is below a pre-determined threshold (e.g., a page write). Because of the small size of the data, the memory interface may determine that a suspension of the programming may cause the write operation to appear significantly longer, which may be inconvenient for a user of the electronic device.

As another example, the memory interface can maintain a ratio of the number of programmed blocks to the number of wear leveling operations. Using this ratio, the memory interface can determine a minimum number of blocks that need to be programmed before a wear leveling operation is warranted. For instance, if the ratio of programmed blocks-to-wear leveling operations is ten-to-one, the memory interface may have determined not to suspend the programming of the data if less than ten blocks have been programmed since the previous wear leveling operation.

Thus, if, at step 914, the memory interface determines that the programming of the data should not be suspended, process 900 may return to step 910. At step 910, the memory interface can program a second portion of the data to a second block of the NVM.

Returning to step 914, the memory interface may have instead determined that programming should be suspended based on determining that system performance is not important at this time (e.g., the write request is not time-critical). For example, the memory interface may have determined that the I/O priority of the write request is low based on metadata associated with the write request.

In other embodiments, the memory interface may have determined that the bandwidth of the write operation permits a suspension of the programming of the data. For example, the memory interface may have determined that the size of the data to be written is above a pre-determined threshold (e.g., a write that extends across block boundaries). Because of the large size of the data, the memory interface may determine that a suspension of the programming may not cause the write operation to appear significantly longer, and therefore may not feel as pronounced or be as inconvenient for a user of the electronic device.

As another example, if the ratio of programmed blocks-to-wear leveling operations is ten-to-one, the memory interface may have determined to suspend the programming of data if at least ten blocks have been programmed since the previous wear leveling operation.

Thus, if one or more of these factors are satisfied, the memory interface can suspend the programming of the data on a block-aligned boundary. Process 900 may then continue to step 916.

At step 916, the memory interface can select a low-cycled block of the NVM (e.g., block 606 of FIG. 6-8). In some embodiments, the low-cycled block can be selected from a wear leveling queue. For example, the low-cycled block can be a static block of the NVM. In some embodiments, the low-cycled block can be a block of the NVM that has the most static data (e.g., a block that is filled with at least 90% of static data). In some cases, the memory interface can determine which block has the most static block using heuristics or indications from applications in the system.

Continuing to step 918, the memory interface can initiate wear leveling on the low-cycled block of the NVM. For example, the memory interface can free up the low-cycled block by copying data from the low-cycled block (e.g., static data) to another block of the NVM (e.g., block 604 of FIGS. 6-8). In some embodiments, the block where the data is being copied may be the highest-cycled block of the NVM. In other embodiments, the block where the data is being copied may be selected based on a programming order of the memory interface. After all of the data has been copied, the memory interface can erase the data on the low-cycled block.

At step 920, the memory interface can determine that wear leveling has completed. After determining that wear leveling has completed, the memory interface can resume the programming of the data.

Continuing to step 922, the memory interface can select a new dynamic block of the NVM to program the data. In some embodiments, the memory interface can select the previously selected low-cycled block (e.g., block 606 of FIGS. 6-8) as the new dynamic block. In other embodiments, the memory interface can select a lowest-cycled block of the non-volatile memory as the new dynamic block, which may or may not be the same as the low-cycled block. After selecting the new dynamic block, process 900 may move to step 924.

At step 924, the memory interface can program a second portion of the data to the new dynamic block of the NVM. In some embodiments, the wear leveling and data programming processes provided in steps 914-924 can be performed in a manner similar to the example provided in FIGS. 6 and 7. After programming the second portion of the data, process 900 may end at step 912. Persons skilled in the art will appreciate that, in some cases, step 924 of process 900 can be the same step as step 910 of process 900.

It should be understood that process 900 of FIG. 9 is merely illustrative. Any of the steps of process 900 may be removed, modified, or combined, and any additional steps may be added, without departing from the scope of the invention.

The described embodiments of the invention are presented for the purpose of illustration and not of limitation.

What is claimed is:

1. A method for aligning data in a non-volatile memory, the method comprising:
   receiving a write request to program data to the non-volatile memory; and
   in response to receiving the write request:
      programming a first portion of data to a first block of the non-volatile memory; and
      upon reaching the end of the first block, determining whether to suspend the programming of the data in order to perform wear leveling based on at least one factor, wherein the determining whether to suspend the programming further comprises determining a size of the data, and wherein in response to determining that the size of the data is above a pre-determined threshold, suspending the programming of the data on the block-aligned boundary in order to perform wear leveling.

2. The method of claim 1, wherein the determining whether to suspend the programming further comprises:
   receiving a suppression command from a file system; and
   programming the second portion of the data to a second block.

3. The method of claim 1, wherein the determining whether to suspend the programming further comprises determining an input/output ("I/O") priority of the data.

4. The method of claim 3, wherein in response to determining that the I/O priority is high, programming a second portion of the data to a second block.

5. The method of claim 3, wherein in response to determining that the I/O priority is low, suspending the programming of the data on the block-aligned boundary in order to perform wear leveling.

6. The method of claim 1, wherein in response to determining that the size of the data is below a pre-determined threshold, programming a second portion of the data to a second block.

7. The method of claim 1, wherein in response to determining that the size of the data is above a pre-determined threshold, suspending the programming of the data on the block-aligned boundary in order to perform wear leveling.

8. The method of claim 1, wherein the determining whether to suspend the programming further comprises maintaining a ratio of a number of programmed blocks to a number of wear leveling operations.

9. The method of claim 1, wherein the determining whether to suspend the programming further comprises determining whether the write request is time-critical.

* * * * *